United States Patent
Neil et al.

(10) Patent No.: US 7,823,716 B2
(45) Date of Patent: Nov. 2, 2010

(54) PRODUCT STABILIZING CONVEYOR SYSTEM AND METHOD

(75) Inventors: John G. Neil, Hammonton, NJ (US); Michael T. Earling, Folsom, NJ (US)

(73) Assignee: Garvey Corporation, Blue Anchor, NJ (US)

(*) Notice: Subject to any disclaimer, the term of this patent is extended or adjusted under 35 U.S.C. 154(b) by 67 days.

(21) Appl. No.: 12/315,750

(22) Filed: Dec. 4, 2008

(65) Prior Publication Data

US 2010/0140055 A1 Jun. 10, 2010

(51) Int. Cl.
B65G 47/26 (2006.01)
(52) U.S. Cl. .................... 198/442; 198/452
(58) Field of Classification Search ........... 198/442, 198/452, 457.05, 457.01, 456
See application file for complete search history.

(56) References Cited

U.S. PATENT DOCUMENTS

| | | | | |
|---|---|---|---|---|
| 2,670,835 A | * | 3/1954 | Huttmann | 198/442 |
| 3,580,640 A | * | 5/1971 | Eriksson | 198/442 |
| 3,848,746 A | * | 11/1974 | van der Winden | 198/442 |
| 6,241,074 B1 | * | 6/2001 | Steeber | 198/456 |
| 7,252,186 B2 | * | 8/2007 | Paquin et al. | 198/452 |
| 7,322,459 B2 | * | 1/2008 | Garvey | 198/442 |

* cited by examiner

Primary Examiner—James R Bidwell
(74) Attorney, Agent, or Firm—Stuart M. Goldstein

(57) ABSTRACT

A product stabilizing conveyor system for a continuous, segmented lane curvilinear conveyor having linear and curvilinear sections. The conveyor is configured to transport small products, e.g. 0.46 diameter glass vials, in circular fashion. Wedged-shaped diverter elements are positioned at the juncture between a linear section and curvilinear section of the conveyor, after the registry and outfeed area. The diverter elements serve to direct the minute vials away from the larger interstices which form on the outbound paths of travel of the curvilinear section and towards the smaller sized interstices on the inboard paths of travel. Diverting the vials in this manner ensures they do not cross over the edges of the larger sized interstices and fall over onto the conveyor surface. Instead they remain upright as they travel around the curvilinear section and hence around the entire conveyor.

20 Claims, 4 Drawing Sheets

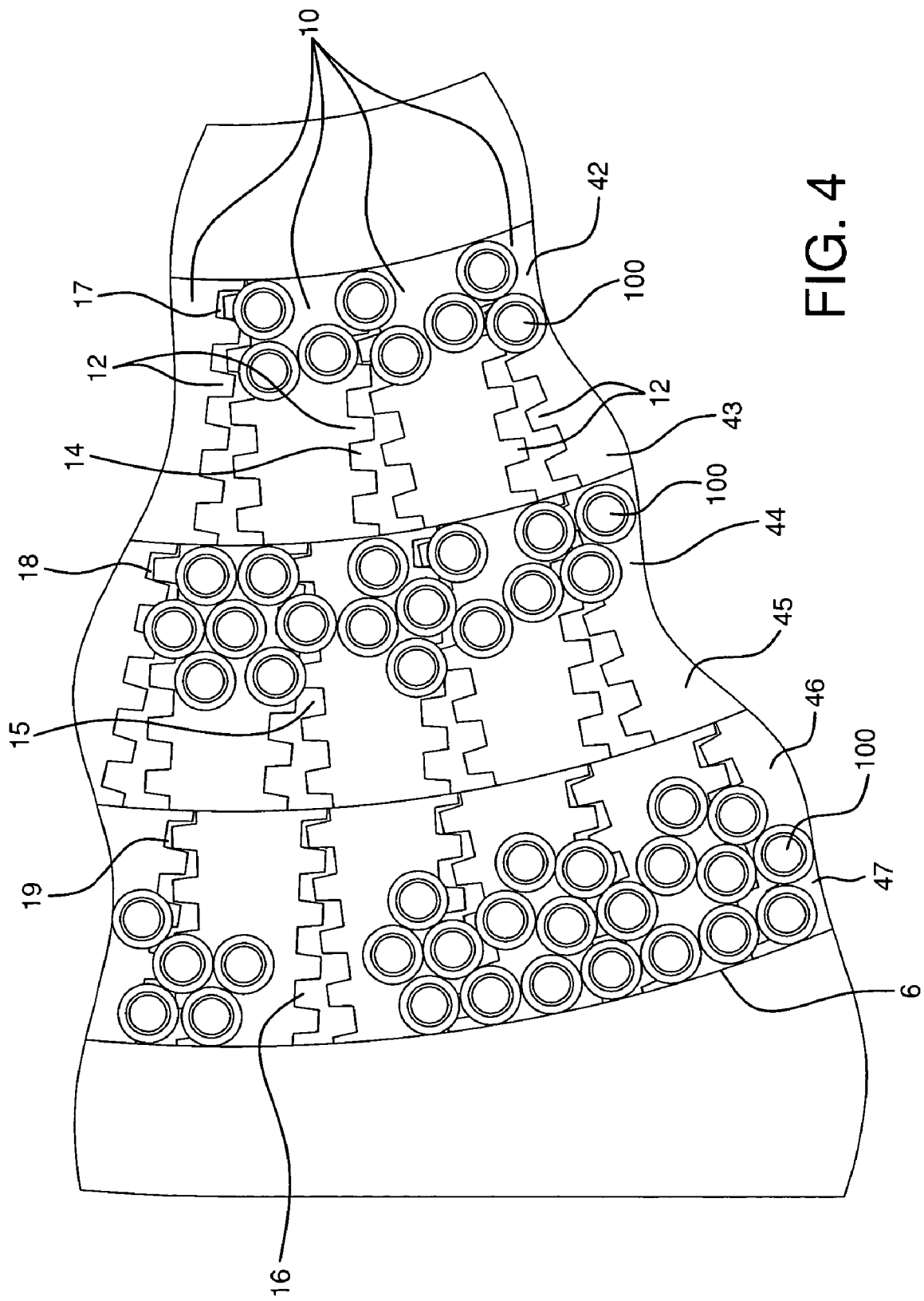

PRODUCT STABILIZING CONVEYOR SYSTEM AND METHOD

BACKGROUND OF THE INVENTION

Conveyor systems are employed to transport a wide variety of products, containers, vessels, and items of all shapes and sizes. The movement of each differently sized and configured product presents its own unique challenges, including the challenge of maintaining the integrity of the conveying system by ensuring that products remain in their originally placed, upright positions. Products which tend to tip and fall over while being moved along a conveyor present significant problems, not the least of which is the disruption of the product conveying process from the point of the product failure, down to the discharge destination, and back up to the upstream supply station.

The challenge which is faced in conveying small, lightweight articles on the conveyor systems which are currently commercially available is even greater. Such products are highly susceptible to toppling over, not only because of their lightweight, but also because their minute dimensions make them more apt to falling when they encounter the gaps or interstices inherently located within the conveyor lanes of the systems designed to move these items. For instance, glass vial vessels, 0.46 inches in diameter and 1.259 inches in height, commonly used in the pharmaceutical industry, must be transported en masse on smaller conveyor systems. However, the minute dimensions of these items create problems in maintaining the integrity of such systems. When even a single vial, upon encountering an interstice in a conveyor lane, is caused to fall from its upright position, significant difficulties result. The failure of one vial will cause toppling of numerous vials, which in turn causes extreme disruption of the overall product transport system. Expensive and wasteful downtime is the result.

SUMMARY OF THE INVENTION

It is thus an object of the present invention to address the limitations and disadvantages caused by product disruption on existing conveyor systems.

It is the object of the present invention to provide a product stabilizing conveyor system for a conveyor which maintains the upright integrity of items, especially minute items, being transported around the conveyor.

It is another object of the present invention to provide a product stabilizing conveyor system which is readily adaptable to existing conveyors and which has relatively few components which are easy to install.

It is a further object of the present invention to provide a product stabilizing conveyor system having diverter elements advantageously positioned between the conveyor paths of travel of products to ensure that such products are directed to those paths of travel which prevent them from falling and maintains them in an upright position.

These and other objects are accomplished by the present invention, a product stabilizing conveyor system for a continuous, segmented lane curvilinear conveyor having linear and curvilinear sections. The conveyor is configured to transport small products, e.g. 0.46 diameter glass vials, in circular fashion. Wedged-shaped diverter elements are positioned at the juncture between a linear section and curvilinear section of the conveyor, after the registry and outfeed area. The diverter elements serve to direct the minute vials away from the larger interstices which form on the outbound paths of travel of the curvilinear section and towards the smaller sized interstices on the inboard paths of travel. Diverting the vials in this manner ensures they do not cross over the edges of the larger sized interstices and fall over onto the conveyor surface. Instead they remain upright as they travel around the curvilinear section and hence around the entire conveyor.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 4 is an enlarged view of vials being transported on a section of a conveyor which employs the present invention.

DETAILED DESCRIPTION OF THE INVENTION

Figure 1:
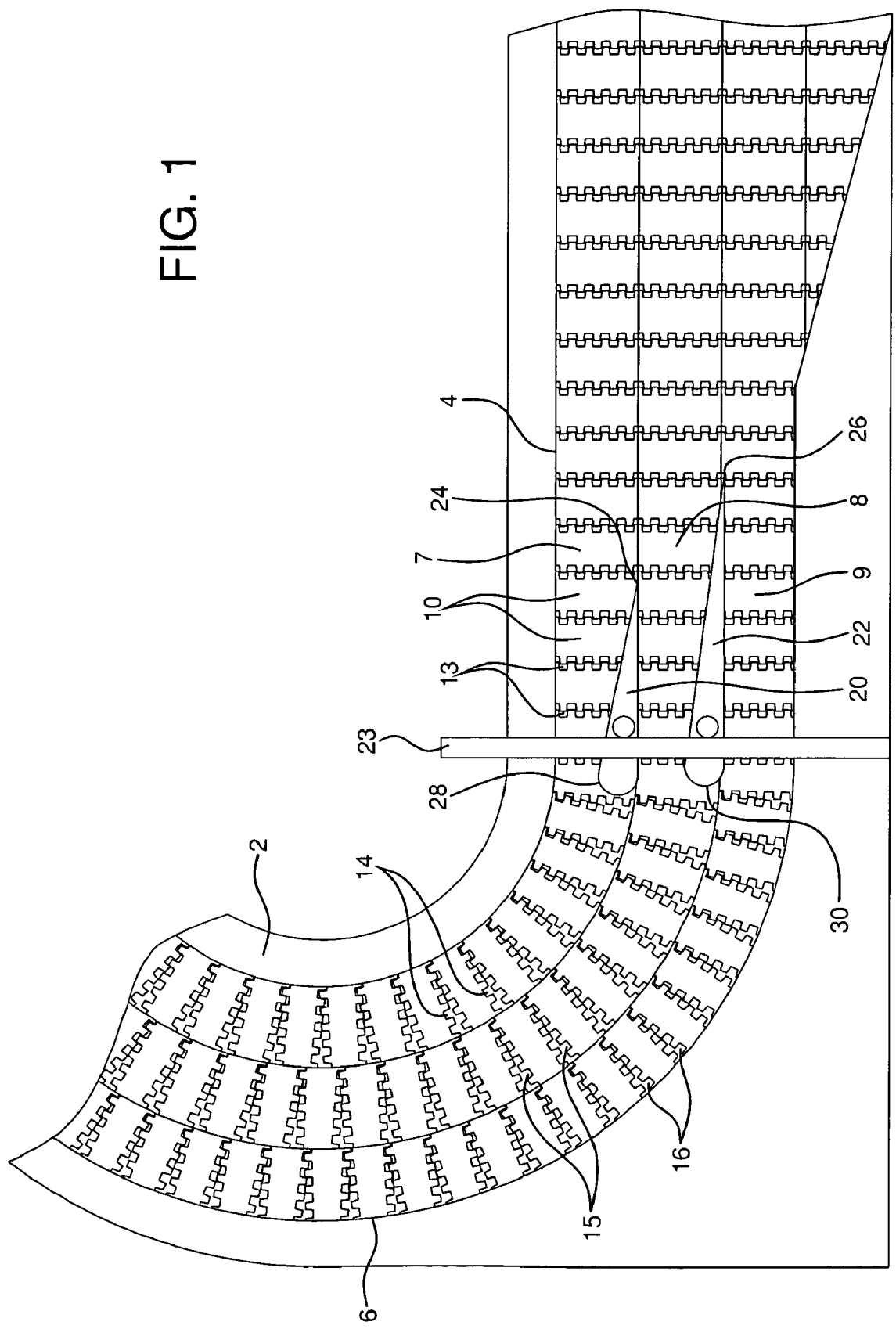
FIG. 1 is a plan view of the operative section of the product stabilizing conveyor system of the present invention.

The product stabilizing conveyor system of the present invention forms a part of and is designed to be used with standard, continuous, segmented track, curvilinear conveyors which transport minute products, e.g. glass vials which can be as small as 0.46 inches in diameter and 1.259 inches in height. FIG. 1 shows one linear section 4 and one curvilinear section 6 at the outfeed area of such a representative conveyor 2.

Conveyor 2 in FIG. 1 comprises three separate product carrying conveyor lanes 7, 8, and 9 which move parallel to and are in adjacent alignment with each other. Such lane rows are routinely made up of a plurality of meshed segments 10, each with teeth 12 which engage adjacent segments. See FIG. 3. Small gaps or interstices separate segments 10 at the areas of engagement with adjacent segments. These interstices permit the system of segments 10 the flexibility to expand as conveyor 2 moves through its curvilinear sections, such as 6, and to contract as the conveyor moves through its linear sections, such as 4.

Figure 3:
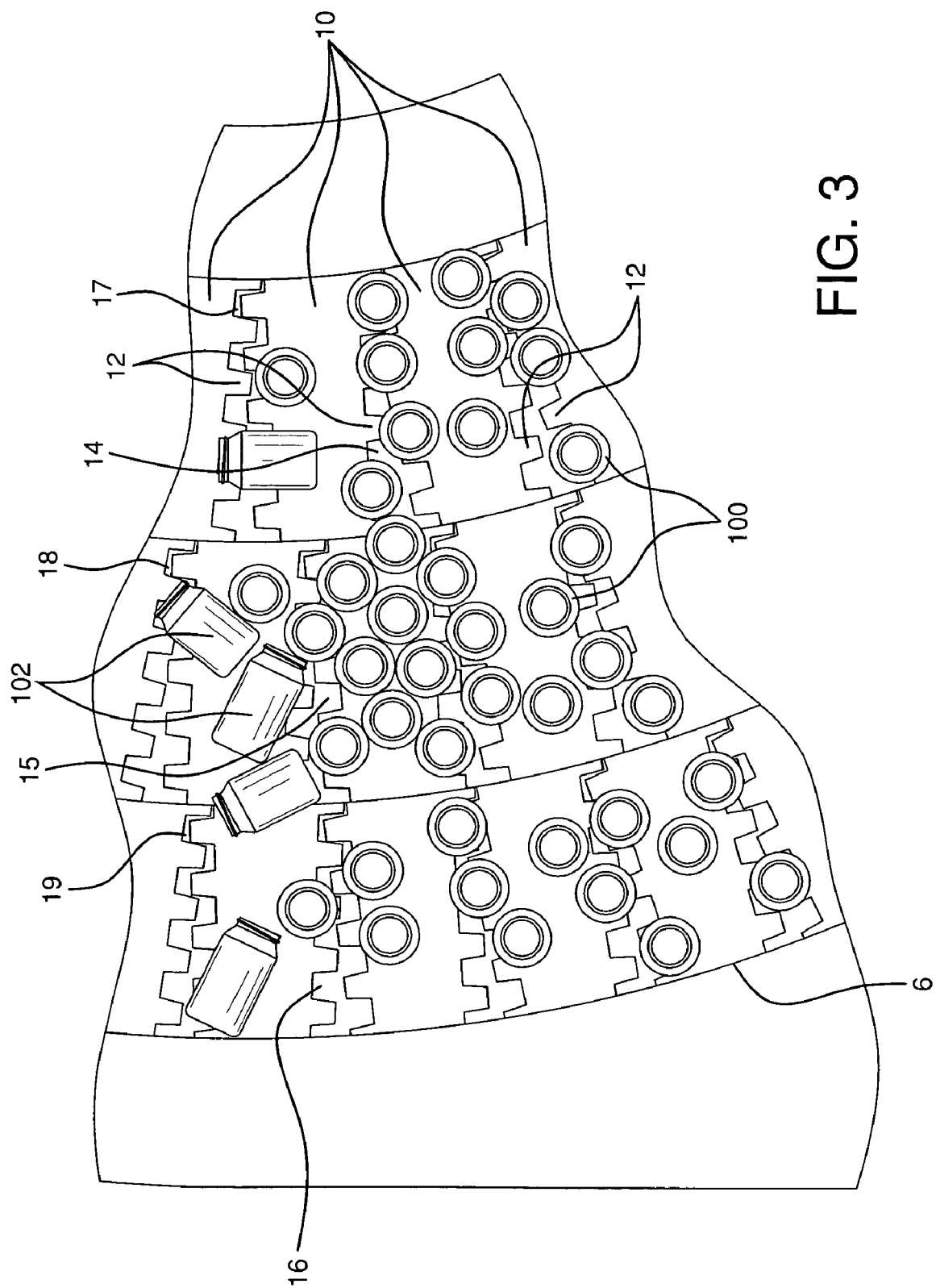
FIG. 3 is an enlarged view of vials being transported on a section of a conveyor which does not employ the present invention.

Interstices 13 between segments 10, which make up linear section 4 of moving conveyor 2, are relatively small and substantially uniform in size. However, as conveyor 2 progresses through its curvilinear section 6, as shown in FIG. 3, segments 10 become increasingly separated, resulting in inboard smaller interstices 17, 18 and 19, but creating outboard interstices 14, 15 and 16 of the curvilinear section which become increasingly larger in size.

When minute products, such as 0.46 inch diameter glass vials 100, are transported around conveyor 2, those vials on linear section 4, with its small, uniformly sized interstices 13, remain upright on the conveyor section, since the vials' diameter are greater than the size of the interstice. However, absent the present invention and as shown in FIG. 3, as vials 100 are transported through curvilinear section 6, many of the vials will contact the edge of gradually opening interstices 14, 15, and 16. This results in certain of the vials 102 immediately falling over onto the surface of conveyor 2, thus disrupting and interrupting the smooth flow of vials around the conveyor.

In order to address and remedy this problem, the present invention positions wedge shaped diverter elements 20 and 22 at linear section 4 just before curvilinear section 6, i.e. the junction between the two sections. Diverter elements 20 and 22 have pointed forward ends 24 and 26 respectively and the elements expand in width such that their rearward ends 28 and 30 each have dimensional widths greater than the size of the largest sized interstice 14, 15 and 16 in curvilinear section 6. Overhead component 23 supports diverter elements 20 and 22 and is adjustable for setting the diverter elements at the optimum angle of contact with oncoming vials 100.

Figure 2:
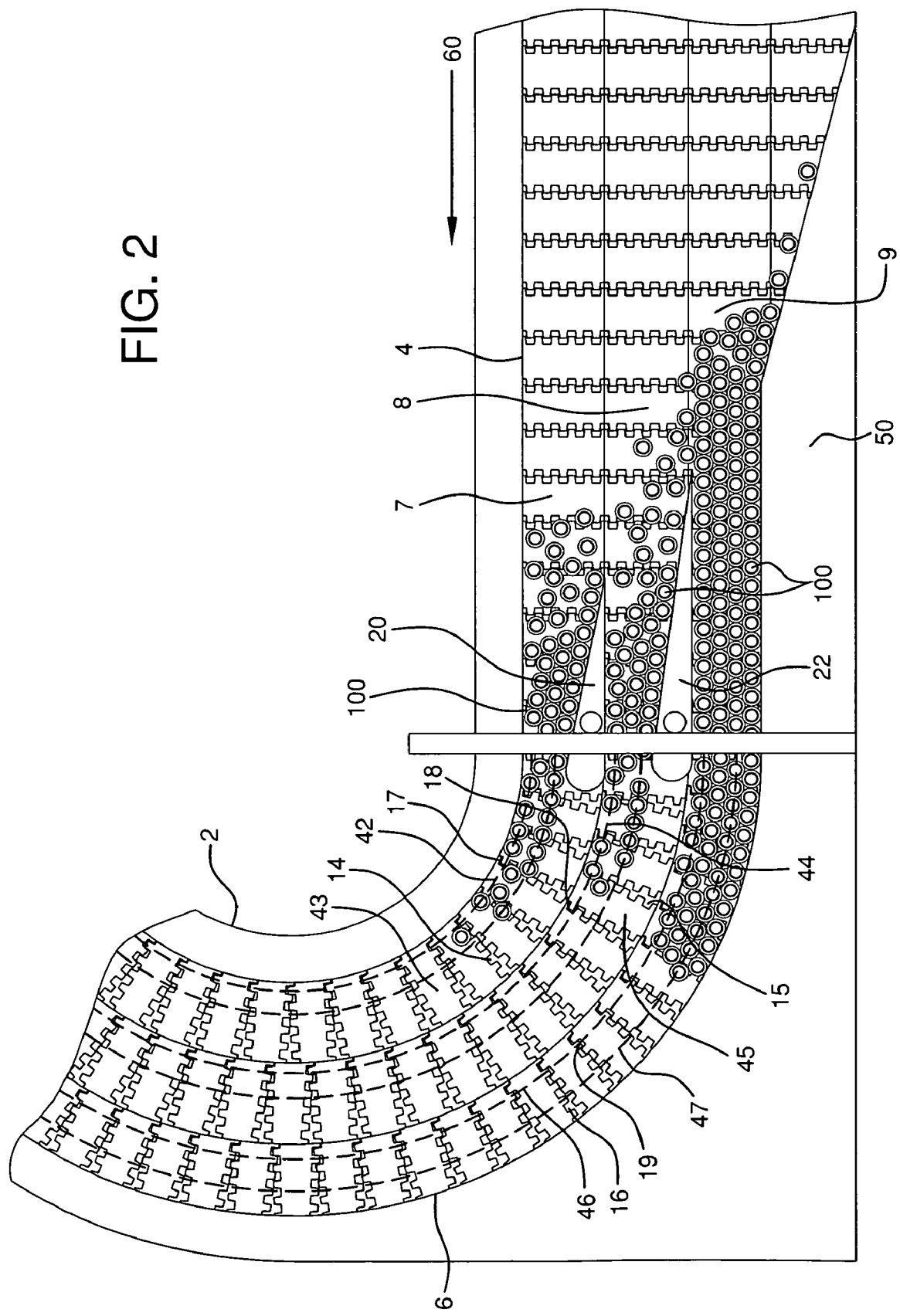
FIG. 2 is a plan view of the operative section of the product stabilizing conveyor system of the present invention in use.

In operation, as best shown in FIG. 2, vials 100 are transported on linear section 4 substantially en masse, in direction of travel 60, from an upstream station, along various, random paths of travel on conveyor lanes 7, 8, and 9. As vials 100 approach diverter elements 20 and 22, they are directed to specific paths of travel along curvilinear section 6 as follows. Diverter element 20 directs vials 100 onto lane 7 and, specifically on to its inboard path 42 with its smaller sized interstices 17, and away from the track's outboard path 43 with its larger sized interstices 14. In similar fashion, diverter element 22, in tandem with diverter element 20, directs vials 100 onto lane 8 and, specifically onto its inboard path 44 with its smaller sized interstices 18, and away from the track's outboard path 45 with its larger sized interstices 15. Diverter element 22 also directs vials 100 onto lane 9, which is adjacent to guide wall 50. Vials 100 are directed both to inboard path 46 of lane 9 where they remain upright and stationary on smaller sized interstices 19, and to the lane's outboard path 47 of the row.

In this manner, vials 100 on lanes 7 and 8 are always transported to and maintained in upright position on smaller sized interstices 17 and 18 and diverted away from larger sized interstices 14 and 15. As a result, since vials 100 never come in contact with the larger sized interstices, they avoid these gaps and the hazard of falling over as a result. Vials 100 on inboard path 46 of lane 9 are caused to remain upright, since they too are transported to and remain on smaller sized interstices 19. Vials 100 on outboard path 47 of lane 9 remain upright as well, since they are wedged between and compressed by the force exerted against them by the vials being transported on inboard path 46 on one side, and the wall surface of product guide 50 on the other side.

The product stabilizing conveyor system of the present invention simply and effectively solves the problem of maintaining very small items in their upright positions, as they are transported around segmented track conveyors. This results in a smooth, uninterrupted flow of the items around the conveyor.

While one embodiment of the invention is described herein, that embodiment may be altered without departing from the spirit of the invention. For instance, more than three tracks can be used with a corresponding increase in the number of diverter elements for wider conveyor systems. The diverter elements, while they are shown herein suspended over the conveyor's lanes of travel, can be located substantially beneath or embedded within the conveyor's lanes of travel. The angular placement of the diverter elements in relation to the number of lanes of travel can be adjusted for optimum deflection of transported items.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A product stabilizing conveyor system for maintaining the upright position of transported products, said system comprising:

a moving, multi-lane conveyor comprising adjacent linear and curvilinear sections, each section comprising a plurality of meshed segments, the meshed segments which form the linear sections being separated by substantially uniform sized interstices, and the meshed segments which form the curvilinear sections being separated by interstices of varying sizes, including interstices which are larger than the interstices in the linear section; and means positioned between the linear and curvilinear sections for directing products being transported on the conveyor away from the larger interstices of the curvilinear segments to maintain the products in upright positions on the moving conveyor, said means for directing products comprising two diverter elements located at the junction between a linear and curvilinear section.

2. The product stabilizing conveyor system as in claim 1 wherein the diverter elements are elongated members each having a forward and a rearward end, the rearward ends having a greater dimensional widths than the largest interstice in the curvilinear section.

3. The product stabilizing conveyor system as in claim 2 wherein the diverter elements are wedge shaped.

4. A product stabilizing conveyor system for maintaining the upright position of transported products, said system comprising:

a moving, multi-lane conveyor comprising adjacent linear and curvilinear sections, said sections each having inboard paths of travel and outboard paths of travel; and means positioned between the linear and curvilinear sections for directing products being transported on the conveyor from the inboard paths of the linear section away from the outboard paths of the curvilinear section and towards the inboard paths of the curvilinear section, said means for directing products comprising two diverter elements located at the junction between a linear and curvilinear section, whereby in so directing the transported products, said products are, at all times maintained in an upright position on all paths of the moving conveyor.

5. The product stabilizing conveyor system as in claim 4 wherein the diverter elements are wedge shaped.

6. The product stabilizing conveyor system as in claim 4 wherein the outboard paths of the curvilinear section comprises interstices and the means for directing transported products directs said products away from the interstices.

7. The product stabilizing conveyor system as in claim 4 wherein the diverter elements are elongated, wedge shaped members each having a forward and rearward end, the rearward ends having a greater dimensional widths than the largest interstice in the outboard paths of the curvilinear section.

8. The method of maintaining the upright position of conveyor transported products comprising the steps of:

providing a multi-lane conveyor having adjacent linear and curvilinear sections, each section comprising a plurality of meshed segments, the meshed segments which form the linear sections being separated by substantially uniform sized interstices, and the meshed segments which form the curvilinear sections being separated by interstices of varying sizes, including interstices which are larger than the interstices in the linear section;

moving products from an upstream source on the linear section of the conveyor towards the curvilinear section;

providing two diverter elements at the junction between the linear section and the curvilinear section;

employing the two diverter elements to direct moving products away from the larger interstices and toward the smaller interstices of the curvilinear section; and maintaining the products on the curvilinear section in upright positions on the curvilinear section as to products move around the curvilinear section.

9. The method of maintaining the upright position of conveyor transported products comprising the steps of:
providing a multi-lane conveyor having adjacent linear and curvilinear sections, said sections each having inboard paths of travel and outboard paths of travel;
moving products from an upstream source on the linear section of the conveyor towards the curvilinear section;
providing two diverter elements at the junction between the linear section and the curvilinear section;
employing the two diverter elements to direct moving products being transported on the conveyor from the inboard paths of the linear section away from the outboard paths of the curvilinear section and towards the inboard paths of the curvilinear section; and
maintaining the products on the curvilinear section in upright positions on the curvilinear section as to products move around the curvilinear section.

10. A product stabilizing conveyor system for maintaining the upright position of transported products, said system comprising:
a single, moving conveyor comprising a linear section and an adjacent curvilinear section extending from the linear section, each section comprising a plurality of separate adjacent product transporting lanes of travel, each of said lanes of travel comprising a plurality of meshed segments, the meshed segments of a lane of travel being located adjacent to the meshed segments of an adjacent lane of travel, the meshed segments forming the linear section being separated by substantially uniform sized interstices which extend substantially across each meshed segment, and the meshed segments forming the curvilinear section being separated by interstices of varying sizes which extend substantially across each meshed segment, and include interstices which are larger than the interstices in the linear section; and
means positioned substantially over only the linear section at the junction between the linear and curvilinear sections for directing products being transported on the conveyor away from the larger interstices of the curvilinear section to maintain the products in upright positions on the moving conveyor.

11. The product stabilizing conveyor system as in claim 10 wherein the means for directing products comprises at least one diverter element.

12. The product stabilizing conveyor system as in claim 11 wherein the diverter element is an elongated member having a forward and a rearward end, the rearward end having a greater dimensional width than the largest interstice in the curvilinear section.

13. The product stabilizing conveyor system as in claim 11 wherein the diverter element is wedge shaped.

14. The product stabilizing conveyor system as in claim 12 wherein the diverter element is wedge shaped.

15. The product stabilizing conveyor system as in claim 10 wherein the means for directing products comprises two diverter elements.

16. The product stabilizing conveyor system as in claim 15 wherein the diverter elements are elongated members each having a forward and a rearward end, the rearward ends having greater dimensional widths than the largest interstice in the curvilinear section.

17. The product stabilizing conveyor system as in claim 15 wherein the diverter elements are wedge shaped.

18. The product stabilizing conveyor system as in claim 16 wherein the diverter elements are wedge shaped.

19. The method of maintaining the upright position of conveyor transported products comprising the steps of:
providing a single conveyor having a linear section and an adjacent curvilinear section extending from the linear section, each section having a plurality of separate product transporting lanes of travel, including outboard lanes of travel and inboard lanes of travel, each lane of travel comprising a plurality of meshed segments, the meshed segments of a lane of travel being located adjacent to the meshed segment of an adjacent lane of travel, the meshed segments forming the curvilinear sections being separated by interstices of varying sizes which extend substantially across each meshed segment, and include interstices located in the inboard lanes of travel of the curvilinear section which are larger than the interstices located in the outboard lanes of travel of the curvilinear section and the interstices in the linear section;
moving products from an upstream source on the linear section of the conveyor towards the curvilinear section;
providing at least one diverter element substantially over only the linear section at the junction between the linear section and the curvilinear section; and
employing the diverter element to direct moving products away from the larger interstices in the inboard lanes of travel of the curvilinear section and toward the smaller interstices in the outboard lanes of travel of the curvilinear section; thereby
maintaining the products in upright positions on the curvilinear section as products move around the curvilinear section.

20. The method of claim 19 comprising the further steps of:
providing a second diverter element substantially over only the linear section at the junction between the linear section and the curvilinear section; and
employing both diverter elements to direct products away from the larger interstices in the inboard lanes of travel of the curvilinear section and toward the smaller interstices in the outboard lanes of travel of the curvilinear section.

* * * * *